(12) United States Patent
Kathpalia et al.

(10) Patent No.: US 12,218,990 B2
(45) Date of Patent: Feb. 4, 2025

(54) METHOD AND SYSTEM FOR INTELLIGENT USER WORKLOAD ORCHESTRATION FOR VIRTUAL MEETINGS

(71) Applicant: Dell Products L.P., Round Rock, TX (US)

(72) Inventors: Nitin Kathpalia, Rajasthan (IN); Rameshkumar Kanabhai Varu, Manavadar (IN); Prateek Vishwakarma, Benares (IN); Hema A, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 325 days.

(21) Appl. No.: 17/184,639

(22) Filed: Feb. 25, 2021

(65) Prior Publication Data

US 2022/0270609 A1 Aug. 25, 2022

(51) Int. Cl.
*H04L 65/403* (2022.01)
*G06N 5/04* (2023.01)
*G06N 20/00* (2019.01)
*G10L 15/26* (2006.01)
*H04L 67/53* (2022.01)
*H04M 3/56* (2006.01)

(52) U.S. Cl.
CPC ............. *H04L 65/403* (2013.01); *G06N 5/04* (2013.01); *G06N 20/00* (2019.01); *G10L 15/26* (2013.01); *H04L 67/53* (2022.05); *H04M 3/568* (2013.01)

(58) Field of Classification Search
None
See application file for complete search history.

(56) References Cited

U.S. PATENT DOCUMENTS

| | | | |
|---|---|---|---|
| 6,154,753 A * | 11/2000 | McFarland | G06Q 10/10 715/221 |
| 11,095,468 B1 * | 8/2021 | Pandey | H04L 12/1831 |
| 11,153,532 B1 * | 10/2021 | Gupta | G06F 9/5005 |
| 2008/0181140 A1 * | 7/2008 | Bangor | H04L 65/403 370/261 |
| 2018/0046957 A1 * | 2/2018 | Yaari | G06Q 10/1095 |
| 2018/0095938 A1 * | 4/2018 | Monte | G06Q 10/109 |
| 2018/0101281 A1 * | 4/2018 | Nelson | G06F 3/0482 |

(Continued)

OTHER PUBLICATIONS

University of Houston Downtown, Technology Learning Services, Information Technology, ACAD 700, Outlook 2013: Action Items, Jan. 7, 2019 https://www.uhd.edu/computing/services-training/training/Documents/Outlook2013_ActionItems.pdf.

*Primary Examiner* — Antim G Shah
(74) *Attorney, Agent, or Firm* — Terrile, Cannatti & Chambers, LLP; Emmanuel A. Rivera (57) ABSTRACT

A system, method, and computer-readable medium are disclosed for intelligent User workload orchestration for virtual meetings. A virtual meeting for multiple users is initiated. Voice data of multiple users is received and converted to text data. Machine learning processes the text data to action items to be performed by specific users (i.e., meeting attendees) in real-time. Minutes of the meeting and action items (in the form of real-time and passive recommendations) are generated and provided. In order to perform the action items, determination is made as to which third party applications support the action items and intelligent user workload orchestration is employed.

14 Claims, 5 Drawing Sheets

(56) References Cited

U.S. PATENT DOCUMENTS

| | | | |
|---|---|---|---|
| 2019/0073640 A1* | 3/2019 | Udezue | H04L 12/1818 |
| 2019/0147882 A1* | 5/2019 | Pankanti | H04M 3/567 |
| | | | 704/231 |
| 2020/0279567 A1* | 9/2020 | Adlersberg | G06F 40/35 |
| 2022/0207392 A1* | 6/2022 | Hou | G10L 15/26 |

* cited by examiner

METHOD AND SYSTEM FOR INTELLIGENT USER WORKLOAD ORCHESTRATION FOR VIRTUAL MEETINGS

BACKGROUND OF THE INVENTION

Field of the Invention

The present invention relates to maintenance of computer systems. More specifically, embodiments of the invention relate to integrating minutes of meetings and action items for virtual meetings.

Description of the Related Art

Virtual meetings allow people around the world to connect with one another, regardless of where they may be located. Virtual meetings are a great convenience, avoiding the need for people to travel and at the same physical location. Various applications, including video teleconference (VTC) can be implemented.

Virtual meetings, like conventional in person meetings, typically include minutes of meeting (MoM) which is a summary of the meeting. From the MoM, action items (AI) can be included. One person, such as the organizer of the meeting can take responsibility to provide a MoM and AIs.

The process of providing the MoM be manually writing down notes and accurately interpreting what was said and/or concepts conveyed during the meeting. In other words, manually capturing MoMs can be prone to missing data points and lead to misinterpretation or manipulation. Furthermore, a MoM should accurately define specific AIs, and personnel that are responsible for the AIs. If a nonstandard form of recording MoM is performed, this can lead to confusion while analyzing MoM to derive AIs.

MoMs can be sent out via email to participants and other personnel. As a MoM is transcribed in an email, there can be the possibility of the MoM being archived, lost or deleted. In such instances, there can difficulty in tracking and acting upon the MoM.

In certain instances, different tools (e.g., software applications) can be implemented to perform tasks based on a MoM. With the user of different and varying tools, performing such tasks can be time consuming and cumbersome.

Virtual meetings rely on attendance of personnel. A role call can be taken for attendees during a meeting. In certain instances, it is desirable to determine which personnel are available for future meetings. In particular, this is valuable when determining actions and future plans.

SUMMARY OF THE INVENTION

A system, method, and computer-readable medium are disclosed for intelligent User workload orchestration for virtual meetings. A virtual meeting for multiple users is initiated. Voice data of multiple users is received and converted to text data. Machine learning processes the text data to action items to be performed by specific users (i.e., meeting attendees) in real-time. Minutes of the meeting and action items (in the form of real-time and passive recommendations) are generated and provided. In order to perform the action items, determination is made as to which third party applications support the action items and intelligent user workload orchestration is employed.

BRIEF DESCRIPTION OF THE DRAWINGS

The use of the same reference number throughout the several figures designates a like or similar element. The present invention may be better understood, and its numerous objects, features, and advantages made apparent to those skilled in the art by referencing the accompanying drawings, wherein.

DETAILED DESCRIPTION

A system, method, and computer readable medium are disclosed for integrating of meetings and action items for virtual meetings. In certain implementations, a web application dashboard, cloud-based services that include a machine learning service, and a plugin for a virtual meeting application are provided.

In certain implementations, the web application dashboard allows users to view their virtual meetings and different actions items (AIs) that are recommended relating to third party applications, such as OUTLOOK®, JIRA®, BITBUCKET®, ZOOM®, CONFLUENCE®, etc.

Implementations can provide for cloud-based services to include machine learning service that includes modules, such as an interface, recommender, and listener. The interface service module can provide for calling third party application program interfaces (API), and interfaces with the plugin for the virtual meeting application. The recommender service module can provide for processing translated data as input and generating action items (AIs) as real-time recommendations for each user. The recommender service module can employ Machine Learning algorithms, such as Decision Trees to generate and classify the AIs as real-time or passive recommendations based on the input data. For example, JIRA® application tasks generation, BITBUCKET® application tasks generation, etc. Implementations provide for the recommender service module to automatically fill out input data fields for actions to be performed. For example, in JIRA® story creations, such fields can include "story title," "story points," "epic link" and other mandatory fields. The listener service module provides for interaction between the web application dashboard and cloud services.

For various implementations, the plugin for the virtual meeting application is used to provide voice input to the cloud-based services. The plugin can also be used to notify the users of real time recommendations as received from the cloud-based services. The virtual meeting application can be one of various available meeting applications, such as FACETIME®, ZOOM®, SKYPE®, GOTOMEETING®, etc.

Real time notifications, such as availability of personnel for future meeting is supported by allowing virtual meeting attendees to be proactive during the ongoing virtual meeting. AIs can be automatically integrated with third party applications, such as OUTLOOK®, JIRA®, BITBUCKET®, ZOOM®, CONFLUENCE®, etc. Through the web application dashboard, a centralized location is provided to access and track AIs of virtual meetings. Furthermore, MoMs are structured in a standardized format.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
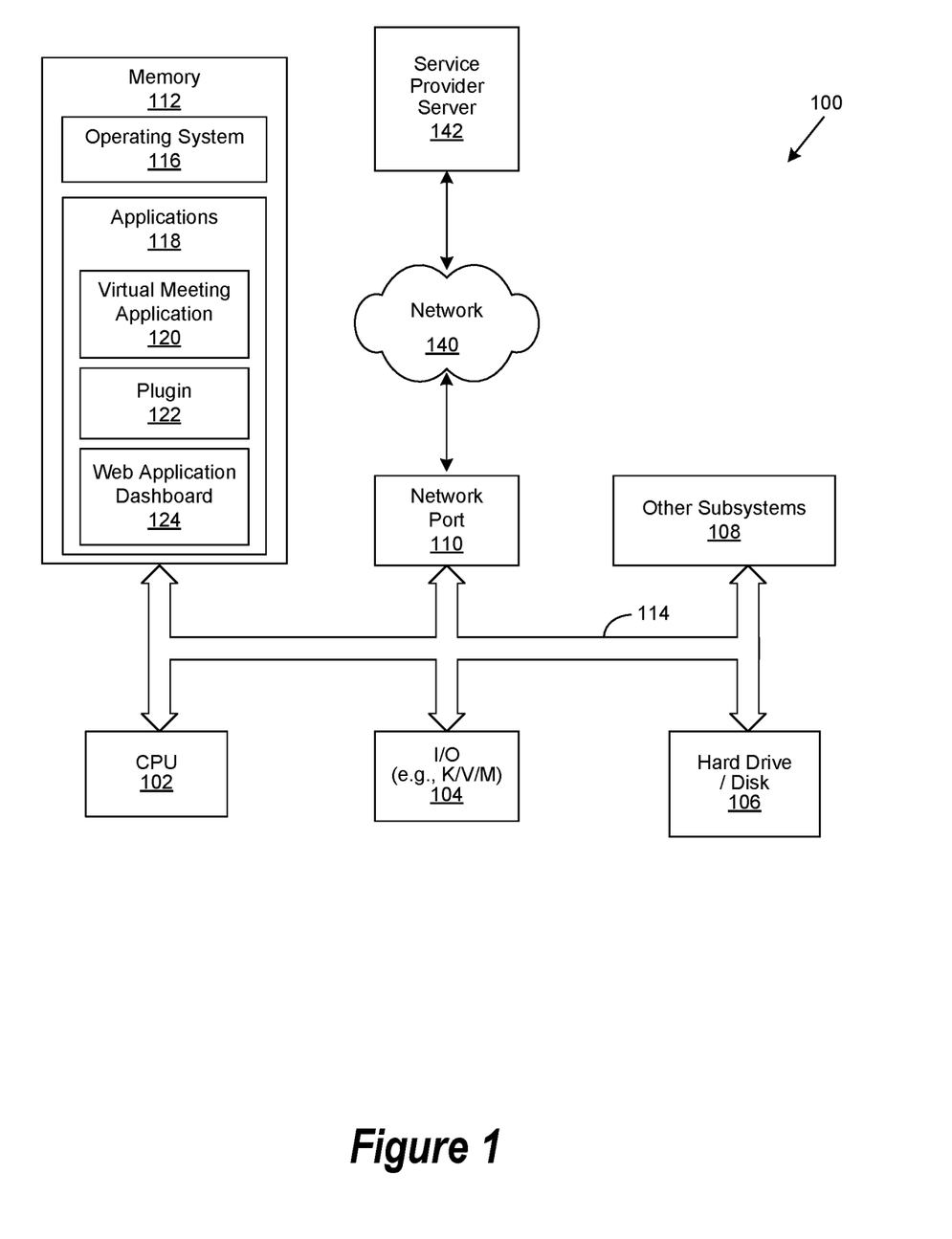
FIG. 1 depicts a general illustration of a computing system as implemented in the system and method of the present invention.

FIG. 1 illustrates an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

The information handling system 100 likewise includes system memory 112, which is interconnected to the foregoing via one or more buses 114. System memory 112 further includes an operating system (OS) 116 and applications 118. In certain embodiments, applications 118 are provided as a service from the service provider server 142.

Certain embodiments provide for applications 118 to include a virtual meeting application 120. As discussed, the virtual meeting application 120 can be one of various virtual meeting applications, such as FACETIME®, ZOOM®, SKYPE®, GOTOMEETING®, etc. Applications 118 can also include plugin 122. As discussed, the plugin 122 can be a plugin for the virtual meeting application that is used to provide voice input to cloud based services. As discussed, the plugin 122 can also be used to notify users of information handling system 100 of real time recommendations as received from the cloud-based services. Applications 118 can further include a web application dashboard 124 as described herein.

Figure 2:
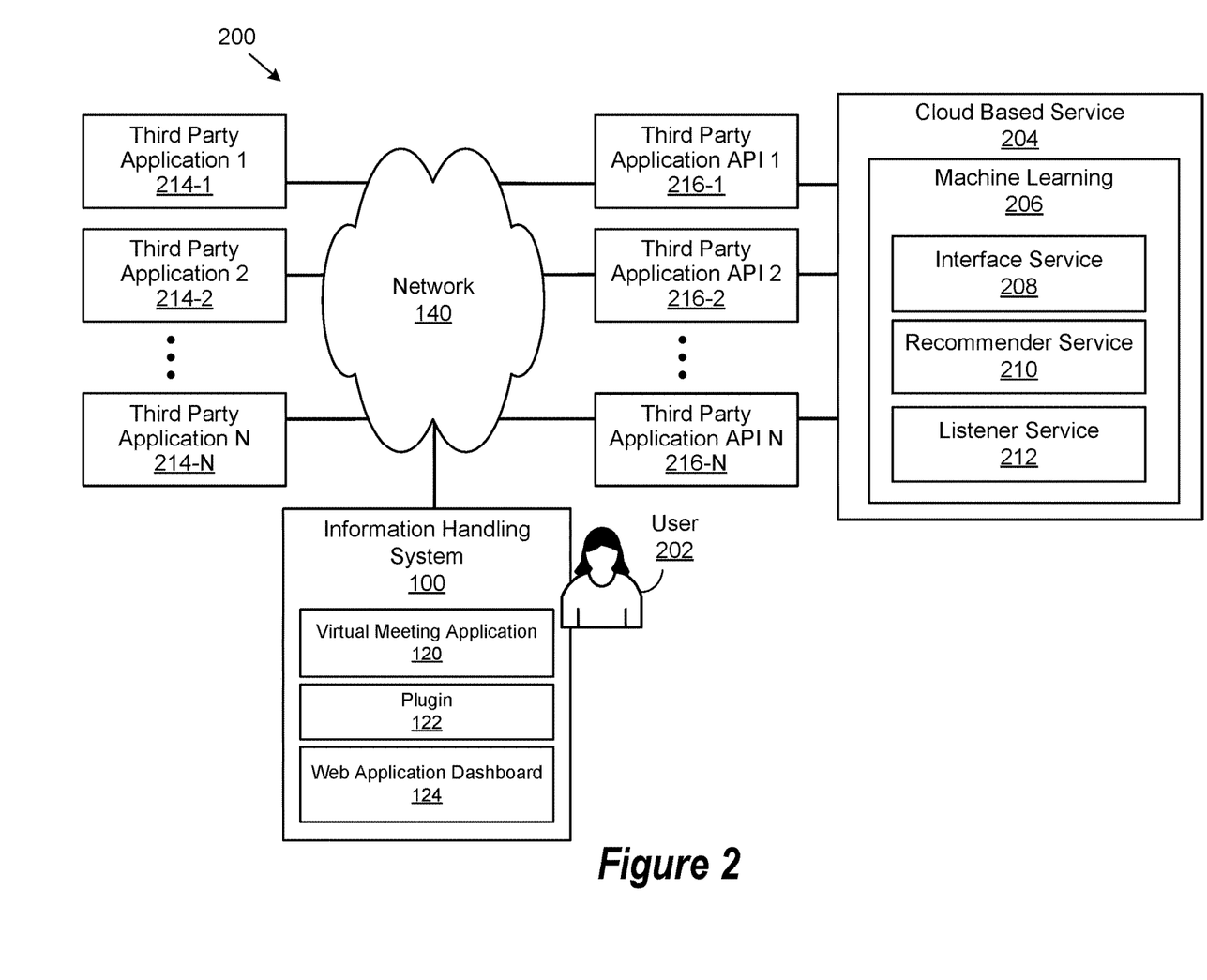
FIG. 2 depicts a system for integrating of minutes of meetings and action items for virtual meetings.

FIG. 2 is a simplified block diagram of a system for integrating minutes of meetings and action items for virtual meetings. In particular, the system 200 includes the information handling system 100 described in FIG. 1. The information handling system 100 is accessed by a user 202. The information handling system 100 including the virtual meeting application 120, the plugin 122 for the virtual meeting application, and the web application dashboard. System 200 further includes the network 140 as described in FIG. 1, to which the information handling system 100 is connected to. The network 140 may be a public network, such as the Internet, a physical private network, a wireless network, a virtual private network (VPN), or any combination thereof.

The system 200 includes a cloud-based service 204. It is to be understood that cloud-based service 204 can be configured as other embodiments, including physical server-based systems. In various implementations, the cloud-based service 204 includes machine learning service modules 206. Implementations can provide for an interface service module 208, a recommender service module 210, and a listener service module 212.

The system 200 includes one or more third party applications as represented by third party application 1 214-1, third party application 2 214-2 through third party application N 214-N. Examples of third-party applications 214 include OUTLOOK®, JIRA®, BITBUCKET®, ZOOM®, CONFLUENCE®, etc. In various implementations, third party applications 214 include a voice to text application, which is used for real time voice to text translation as further described herein.

Implementations of system 200 provide for third party application APIs (application program interfaces) as represented by third party application API 1 216-1, third party application API 2 216-2 through third party application API N 216-N. The third-party application APIs 216 respective support corresponding third party applications 214. For example, third party application API 1 216-1 supports third party application 1 214-1. Third party applications APIs 216 allows the cloud-based service 204 to connect with the respective third-party applications 214. In certain implementations, the interface service module 208 invokes a third-party API 216 to access a third-party application 214 that provides real time voice to text translation.

Figure 3:
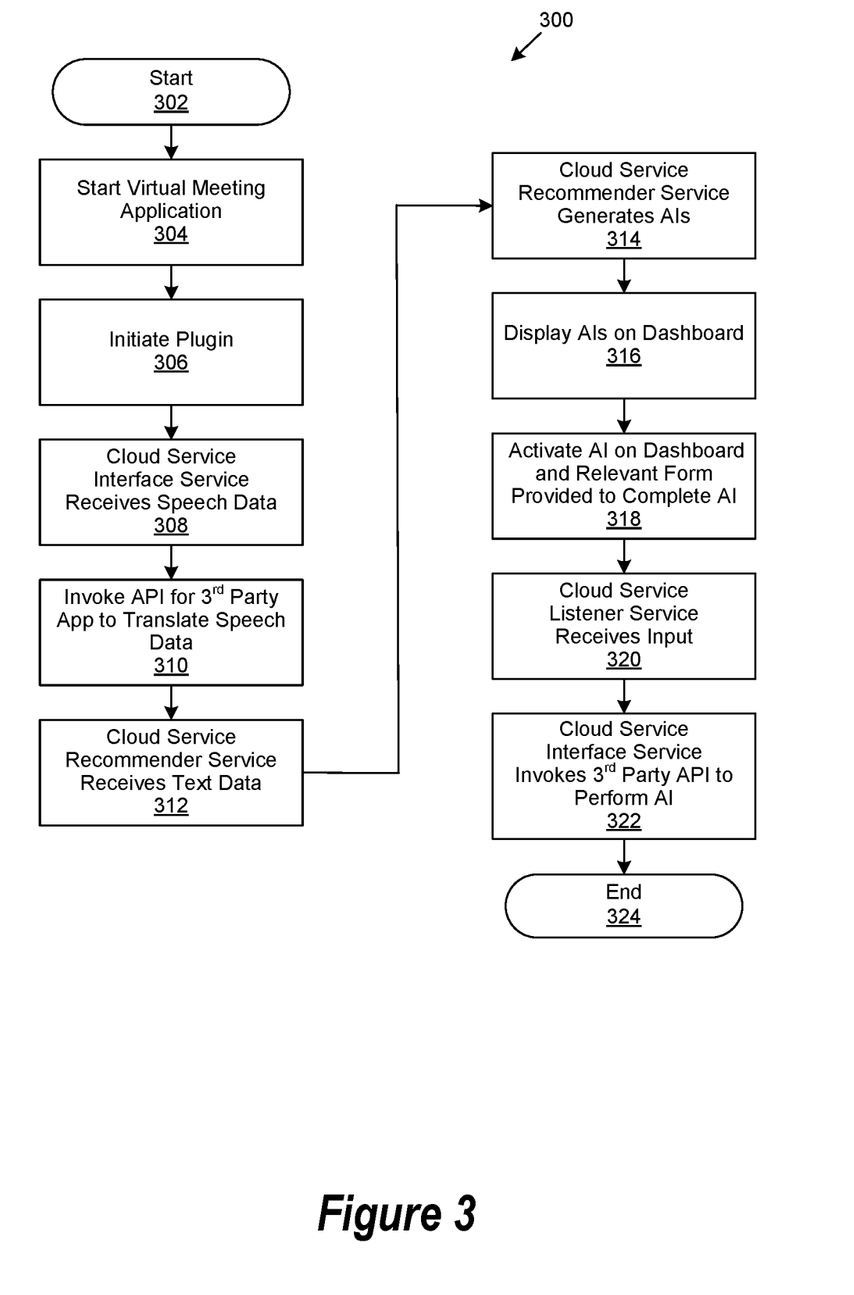
FIG. 3 shows a flow chart for a system for integrating of minutes of meetings and action items for virtual meeting.

FIG. 3 is a generalized flowchart 300 for a system for integrating of minutes of meetings and action items for virtual meeting. In particular, the flowchart generally describes operation of system 200 of FIG. 2. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 302, the process 300 starts. At step 304, the virtual meeting application 120 of information handling system 100 is started. The virtual meeting application 120 is started by the user 202. At step 306, the plugin 122 for the virtual meeting application 120 is initiated. The plugin 122 is used to provide voice input to cloud based services 204.

At step 308, speech data of the user 202 is provided as input to interface service module 208. At step 310, the interface service module 208 invokes a third-party application API 216 to a third-party application 214 that provides real time voice to text translation. Therefore, speech to text translation is provided in real time for the meeting.

At step 312, the translated text data is received by the recommender service module 210. At step 314, the recommender service module 210 generates action items (AIs) along with supported input data fields. The input data fields are to be filled in by users as further described below. In other words, user 202 or other users are to perform an act as to the input data fields.

Recommendations can be real time or passive recommendations. At step 316, real time and passive AIs are displayed on the web application dashboard 124. For real time recommendations, notifications are generated and displayed during the ongoing meeting through plugin 122, allowing meeting attendees to act proactively. For passive recommendations, AIs are displayed in real time on through the web application dashboard 124. Therefore, users can view AIs during an ongoing meeting. Once the meeting ends, users can select AIs to be performed automatically from the recommended list.

Table 1 below is an example of real time and passive recommendations that can be presented/displayed on the web application dashboard 124. For certain implementations, real time AI recommendations can have notifications provided on the virtual meeting application 120 during an ongoing meeting. Passive AI recommendations may not be provided notifications; however, can be displayed in real time on the web application dashboard 124.

TABLE 1

| Sl. No. | Action Item (Recommended) | Real-time/ Passive* | Source |
|---|---|---|---|
| 1. | Meeting scheduling | Real-time | Outlook/Zoom |
| 2. | Attendee's availability | Real-time | Outlook |
| 3. | Correspondence | Passive | Outlook |
| 4. | JIRA task/story creation/log work/ update status | Passive | JIRA |
| 5. | Checkout Repo/create branch/commit/ create or approve pull request/watch issues/comments | Passive | Bitbucket |
| 6. | Create/update/delete/find tasks | Passive | Confluence |

At step 318, AIs on the web application dashboard 124 are activated. The AIs can be activated by user 202 choosing (e.g., clicking on) an AI on the web application dashboard 124. Upon activation, an appropriate form can be activated to be completed. The form includes the input fields that are to be filled by user 202 to perform the AI.

At step 320, the interface service module 208 captures the input data filled or completed by user 202. At step 322, the interface service module 208 invokes the appropriate third-party API 216 to access a third-party application 214 to complete the AI.

Table 2 below is an example of third-party APIs 216 that can be invoked by the interface service module 208.

TABLE 2

| Sl. No. | Third Party App | Rest API |
|---|---|---|
| 1. | Jira | Create, Update, Log Work, Update status https://developer.atlassian.com/server/jira/platform/jira-rest-api-example-create-issue-7897248/ https://developer.atlassian.com/cloud/jira/platform/rest/v3/#api-rest-api-3-dashboard-id-put |
| 2. | Zoom | Schedule Meeting https://marketplace.zoom.us/docs/api-reference/zoom-api/meetings/meetingcreate Audio transcription for cloud recordings https://support.zoom.us/hc/en-us/articles/115004794983-Automatically-Transcribe-Cloud-Recordings- |
| 3. | Outlook | Calendar https://docs.microsoft.com/en-us/previous-versions/office/office-365-api/api/version-2.0/calendar-rest-operations |
| 4. | Bitbucket | Create branch, commit, create/approve pull request, watch issues, comment |
| 5. | Confluence | https://developer.atlassian.com/bitbucket/api/2/reference/ https://developer.atlassian.com/bitbucket/api/2/reference/resource/ Search a confluence page, access, create, update, delete, find all, find tasks https://docs.atlassian.com/ConfluenceServer/rest/7.3.5/ |
| 6. | Azure | Real-time Speech to text translation https://azure.microsoft.com/en-in/services/cognitive-services/#api |

At step 324, the process 300 ends.

Figure 4:
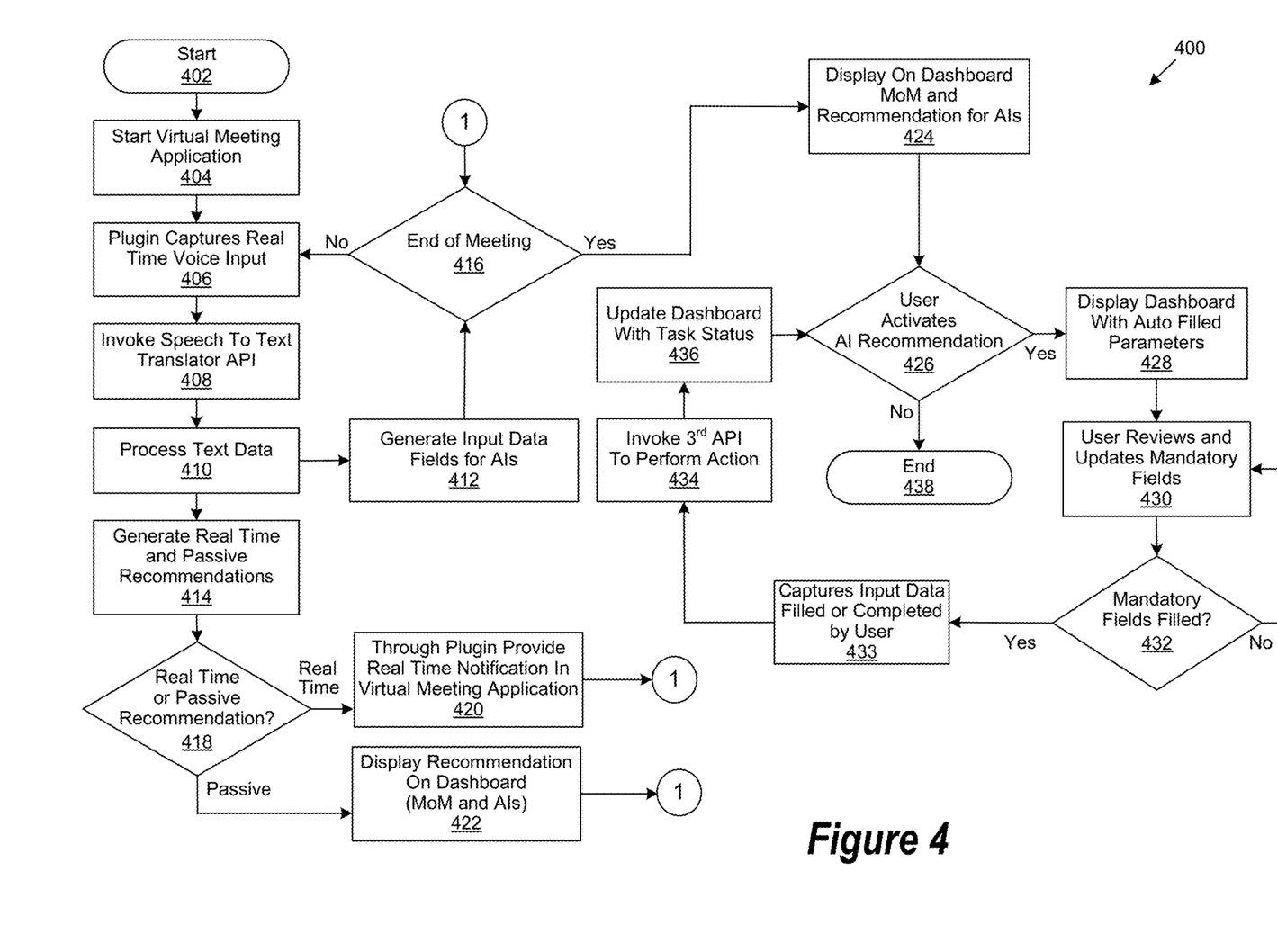
FIG. 4 shows a flow chart for control of a system for integrating of minutes of meetings and action items for virtual meeting.

FIG. 4 is a generalized flowchart 400 for control of a system for integrating minutes of meetings and action items for virtual meeting. In particular, the flowchart generally describes control operation of system 200 of FIG. 2. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 402, the process 400 starts. At step 404, the virtual meeting application 120 of information handling system 100 is started. At step 406, plugin 122 captures user 202 real time voice input. At step 408, the interface service module 208 invokes a third-party application API 216 to a third-party application 214 that provides real time voice to text translation.

At step 410, the third-party application 214 that provides real time voice to text translation provides text data input to the recommender service module 210. At step 412, the recommender service module 210 generates action items (AIs) along with supported input data fields. At step 414, a determination is made if the virtual meeting has ended. If, the virtual meeting has not ended, following the "No" branch of step 414, step 406 is performed, otherwise, the process 400 continues.

Following step 410, at step 416, the recommender service module 210 generates real time and passive recommendations. At step 418, if the recommendations are real time, at step 420, through plugin 122 and virtual meeting application 120, real time notification is provided. If the recommendations, are passive, at step 422 through the web application dashboard 124, recommendations are displayed. Furthermore, a minute of meeting or MoM is displayed at the web application dashboard 124 at steps 420 and 422. The determination step 414 is followed.

If the virtual meeting has ended, following the "Yes" branch of 414, at step 424, the web application dashboard 124 displays the MoM and recommendations for AIs. At step 426, a determination is made if user 202 activates (e.g., clicks on) an AI recommendation. Following the "Yes" branch of step 426, at step 428, a form to be completed is presented on the web application dashboard 124. The form includes the input fields that are to be filled/completed by user 202 to perform. The form is auto filled with the appropriate parameters.

A determination is made at step 432 if the mandatory fields have been filled by the user 202. If the user 202 has not filled all the mandatory fields, following the "No" branch of step 432, step 430 is performed. If the user 202 has filled all the mandatory fields, following the "Yes" branch of step 432, at step 433, interface service module 208 captures the input data filled or completed by user 202. At step 434, the interface service module 208 invokes the appropriate third-party API 216 to access a third-party application 214 to complete the AI. At step 436, the web application dashboard 124 is updated with status. Determination is performed at step 426 as described above. If no additional AIs are to be activated, following the "No" branch of step 426, at step 438, the process 400 ends.

Figure 5:
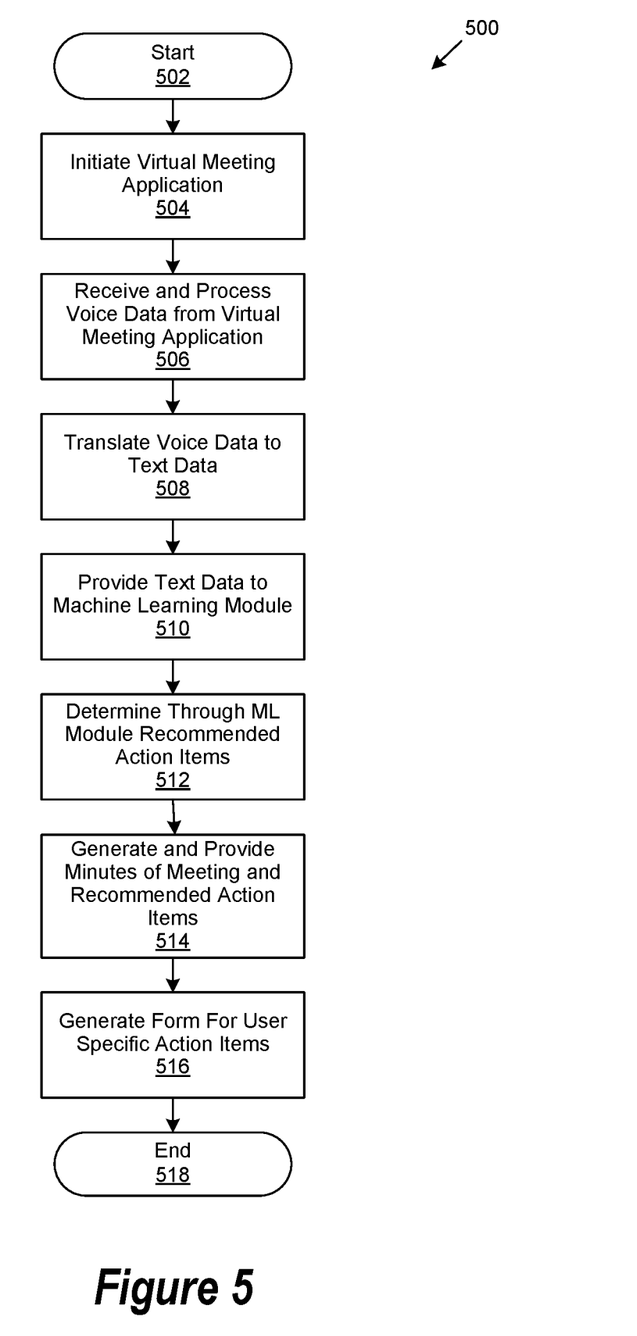
FIG. 5 shows a flow chart for integrating of minutes of meetings and action items for virtual meetings.

FIG. 5 is a generalized flowchart 500 for control of a system for integrating minutes of meetings and action items for virtual meeting. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 502, the process 500 starts. At step 504, a virtual meeting application is initiated to begin or join a virtual meeting. At step 506, voice data through the virtual meeting application through a plugin is received and processed. Implementations provide for a cloud service to determine an application to perform the processing. At step 508, the voice data is translated to text data. At step 510, machine learning service (e.g., module) at the cloud service is provided the text data. At step 512, a determination is performed by the machine learning service determines action items, in the form of real-time or passive recommendations, for users to complete. At step 514, minutes of meetings (MoM) and action items are generated and provided. The MoM can be derived from the text data. At step 516, a form is generated for user specific actions to be performed. At step 518, the process 500 ends.

As will be appreciated by one skilled in the art, the present invention can be embodied as a method, system, or computer program product. Accordingly, embodiments of the invention can be implemented entirely in hardware, entirely in software (including firmware, resident software, microcode, etc.) or in an embodiment combining software and hardware. These various embodiments can all generally be referred to herein as a "circuit," "module," or "system." Furthermore, the present invention can take the form of a computer program product on a computer-usable storage medium having computer-usable program code embodied in the medium.

Any suitable computer usable or computer readable medium can be utilized. The computer-usable or computer-readable medium can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium can be any medium that can contain, store, communicate, or transport the program for use by or in connection with the instruction execution system, apparatus, or device.

Computer program code for carrying out operations of the present invention can be written in an object-oriented programming language such as JAVA, SMALLTALK, C++ or the like. However, the computer program code for carrying out operations of the present invention can also be written in conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through a local area network (LAN) or a wide area network (WAN), or the connection can be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for minutes of meetings and action items for virtual meetings comprising:

accessing a service;
initiating a virtual meeting through the service, of multiple users;
receiving voice data of the multiple users;
converting the voice data to text data;
receiving real-time recommendations from the service;
processing by machine learning the text data to determine user specific action items
generating and providing minutes of the meeting and the user specific action items from the service as a form presented in a dashboard that includes action item recommendations with mandatory fields, wherein the specific action items are real time or passive recommendations generated and displayed during a virtual meeting, allowing inputs from the multiple users to actively choose real time recommendations;
filling out input data fields of task generation applications in the form, of the user specific action items as received by the service;
determining if the mandatory fields have been filed by the user;
invoking a third party application program interface to access a third party application to complete the specific action items; and
determining the third party application of the service to perform the specific action items.

2. The method of claim 1, wherein the converting comprises determining third party application program interface to a voice to text converting third party application and accessing the third party application.

3. The method of claim 1, wherein after a virtual meeting, minutes of meetings and action items are displayed to users.

4. The method of claim 1, wherein after a virtual meeting, forms are generated with user specific input fields to perform the specific action items.

5. The method of claim 4 further comprising determining if users have completed actions for the specific input fields.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
accessing a service;
initiating a virtual meeting through the service, of multiple users;
receiving voice data of the multiple users;
converting the voice data to text data;
receiving real-time recommendations from the service;
processing by machine learning the text data to determine user specific action items
generating and providing minutes of the meeting and the user specific action items from the service as a form presented in a dashboard that includes action item recommendations with mandatory fields, wherein the specific action items are real time or passive recommendations generated and displayed during a virtual meeting, allowing inputs from the multiple users to actively choose real time recommendations;
filling out input data fields of task generation applications in the form, of the user specific action items as received by the service;
determining if the mandatory fields have been filed by the user;
invoking a third party application program interface to access a third party application to complete the specific action items; and
determining the third party application of the service to perform the specific action items.

7. The system of claim 6, wherein the converting comprises determining third party application program interface to a voice to text converting third party application and accessing the third party application.

8. The system of claim 6, wherein after a virtual meeting, minutes of meetings and action items are displayed to users.

9. The system of claim 6, wherein after a virtual meeting, forms are generated with user specific input fields to perform the specific action items.

10. The system of claim 9 further comprising determining if users have completed actions for the specific input field.

11. A non-transitory, computer-readable storage medium embodying computer program code, the computer program code comprising computer executable instructions configured to:
access a service;
initiate a virtual meeting through the service, of multiple users;
receive voice data of the multiple users;
convert the voice data to text data;
receive real-time recommendations from the service;
process by machine learning the text data to determine user specific action items;
generate and provide minutes of the meeting and the user specific action items from the service as a form presented in a dashboard that includes action item recommendations with mandatory fields, wherein the specific action items are real time or passive recommendations generated and displayed during a virtual meeting, allowing inputs from the multiple users to actively choose real time recommendations;
fill out input data fields of task generation applications in the form, of the user specific action items as received by the service;
determine if the mandatory fields have been filed by the user;
invoke a third party application program interface to access a third party application to complete the specific action items; and
determine the third party application of the service to perform the specific action items.

12. The non-transitory, computer-readable storage medium of claim 11, wherein instructions to convert comprise determining third party application program interface to a voice to text converting third party application and accessing the third party application.

13. The non-transitory, computer-readable storage medium of claim 11, wherein after a virtual meeting, minutes of meetings and action items are displayed to users.

14. The non-transitory, computer-readable storage medium of claim 11, wherein after a virtual meeting, forms are generated with user specific input fields to perform the specific action items.

* * * * *